US011600067B2

(12) United States Patent
Lai et al.

(10) Patent No.: US 11,600,067 B2
(45) Date of Patent: Mar. 7, 2023

(54) ACTION RECOGNITION WITH HIGH-ORDER INTERACTION THROUGH SPATIAL-TEMPORAL OBJECT TRACKING

(71) Applicant: NEC Laboratories America, Inc., Princeton, NJ (US)

(72) Inventors: Farley Lai, Plainsboro, NJ (US); Asim Kadav, Jersey City, NJ (US); Jie Chen, Bellevue, WA (US)

(73) Assignee: NEC Corporation

( * ) Notice: Subject to any disclaimer, the term of this patent is extended or adjusted under 35 U.S.C. 154(b) by 51 days.

(21) Appl. No.: 17/016,260

(22) Filed: Sep. 9, 2020

(65) Prior Publication Data

US 2021/0081673 A1 Mar. 18, 2021

Related U.S. Application Data

(60) Provisional application No. 62/899,341, filed on Sep. 12, 2019.

(51) Int. Cl.
*G06V 20/40* (2022.01)

(52) U.S. Cl.
CPC ............. *G06V 20/41* (2022.01); *G06V 20/46* (2022.01)

(58) Field of Classification Search
None
See application file for complete search history.

(56) References Cited

U.S. PATENT DOCUMENTS

| 2019/0156124 | A1* | 5/2019 | Singhal | G06V 20/41 |
| 2019/0248487 | A1* | 8/2019 | Holtz | G06V 10/82 |
| 2019/0354765 | A1* | 11/2019 | Chan | H04N 21/21805 |
| 2020/0117906 | A1* | 4/2020 | Lee | G06K 9/627 |
| 2021/0319232 | A1* | 10/2021 | Perazzi | G06N 3/08 |
| 2021/0342686 | A1* | 11/2021 | Kothari | G06N 3/063 |

\* cited by examiner

*Primary Examiner* — Santiago Garcia
(74) *Attorney, Agent, or Firm* — Joseph Kolodka

(57) ABSTRACT

Aspects of the present disclosure describe systems, methods, and structures that provide action recognition with high-order interaction with spatio-temporal object tracking. Image and object features are organized into into tracks, which advantageously facilitates many possible learnable embeddings and intra/inter-track interaction(s). Operationally, our systems, method, and structures according to the present disclosure employ an efficient high-order interaction model to learn embeddings and intra/inter object track interaction across the space and time for AR. Each frame is detected by an object detector to locate visual objects. Those objects are linked through time to form object tracks. The object tracks are then organized and combined with the embeddings as the input to our model. The model is trained to generate representative embeddings and discriminative video features through high-order interaction which is formulated as an efficient matrix operation without iterative processing delay.

10 Claims, 10 Drawing Sheets

$$Attention(Q, K, V) = softmax\left(\frac{QK^T}{\sqrt{d_k}}\right)V$$

ACTION RECOGNITION WITH HIGH-ORDER INTERACTION THROUGH SPATIAL-TEMPORAL OBJECT TRACKING

CROSS REFERENCE

This disclosure claims the benefit of U.S. Provisional Patent Application Ser. No. 62/899,341 filed Sep. 12, 2019, the entire contents of which is incorporated by reference as if set forth at length herein.

TECHNICAL FIELD

This disclosure relates generally to digital video and computer vision systems. More particularly, it describes action recognition techniques for videos employing spatial-temporal object tracking.

BACKGROUND

Digital video systems and computer vision systems have made extensive use of objecting to identify visual objects for high level video understanding such as action recognition (AR). Unfortunately, object detector systems and methods employed in such systems generally are trained on still images and—as a consequence—tend to detect objects incorrectly or spuriously when applied to video because of motion blur and camera defocus—among other difficulties. Consequently, AR of such objects becomes quite difficult.

SUMMARY

An advance in the art is made according to aspects of the present disclosure directed to systems, methods, and structures that provide action recognition with high-order interaction with spatio-temporal object tracking.

In sharp contrast to the prior art, systems, methods, and structures according to aspects of the present disclosure introduce a high-order interaction approach employing spatio-temporal object tracking to provide improved action recognition (AR).

According to one aspect, systems, methods, and structures according to aspects of the present disclosure organize image and object features into tracks, which advantageously facilitates many possible learnable embeddings and intra/inter-track interaction(s).

Operationally, our systems, method, and structures according to the present disclosure employ an efficient high-order interaction model to learn embeddings and intra/inter object track interaction across the space and time for AR. Each frame is detected by an object detector to locate visual objects. Those objects are linked through time to form object tracks. The object tracks are then organized and combined with the embeddings as the input to our model. The model is trained to generate representative embeddings and discriminative video features through high-order interaction which is formulated as an efficient matrix operation without iterative processing delay.

According to another aspect, systems, methods, and structures according to aspects of the present disclosure may advantageously track person "objects" across multiple video frames to advantageously detect person actions—in real-time.

BRIEF DESCRIPTION OF THE DRAWING

A more complete understanding of the present disclosure may be realized by reference to the accompanying drawing in which.

Figure 1:
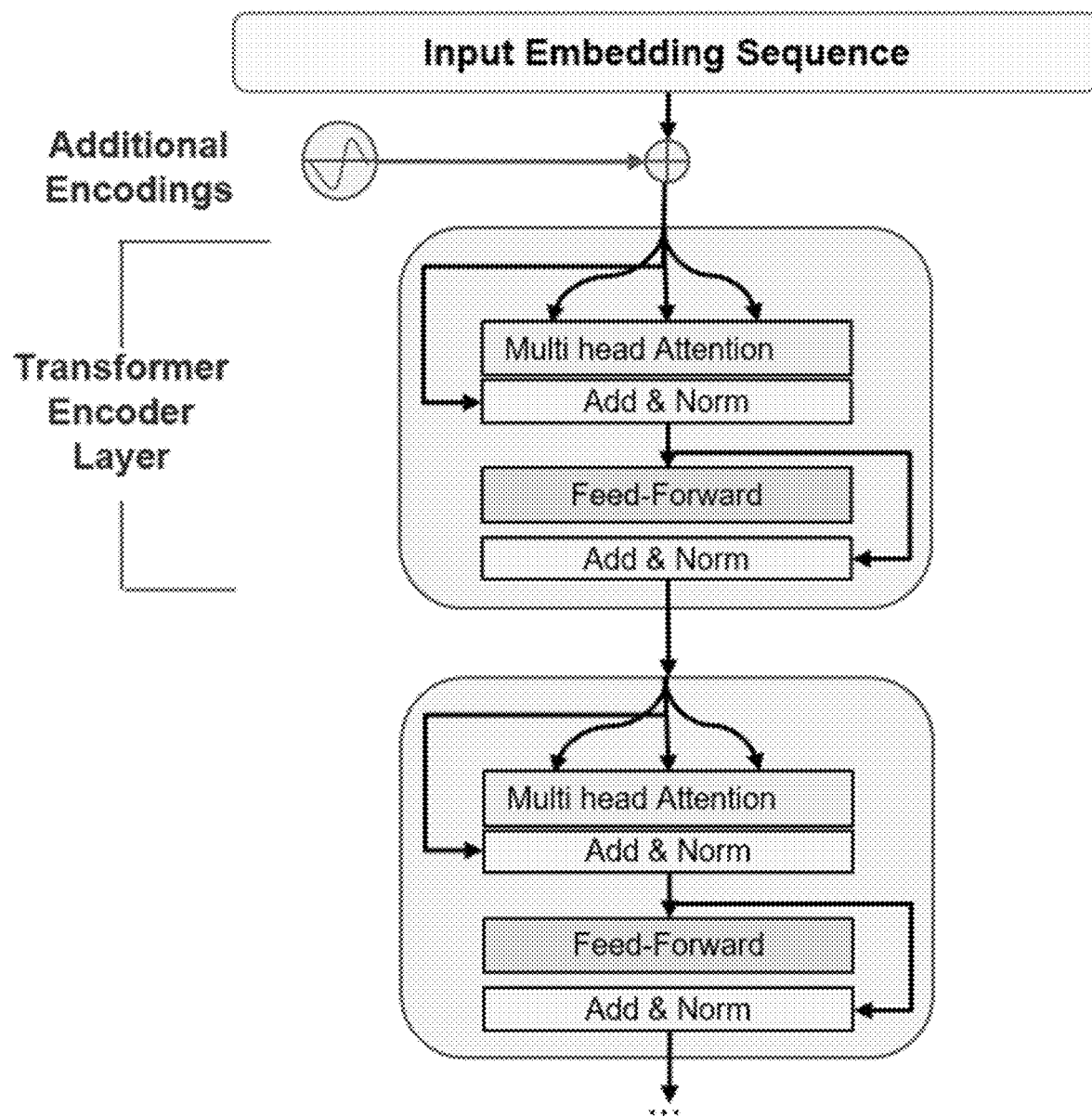
FIG. 1 is a schematic diagram illustrating a transformer encoder unit according to aspects of the present disclosure.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we note that in designing a methodology for modelling higher-order scene interactions to learn rich video embeddings, we have taken some inspiration from recent developments in the field of Natural Language Processing and, more specifically, the transformer architecture.

As is known, transformers solve seq-2-seq tasks by processing sentences in parallel—down to a reduced dimension embedding using an encoder such as that shown schematically in FIG. 1.—and then generates an output sequence by converting a lower dimensional embedding using a decoder. With reference to that FIG. 1, shown therein is a schematic diagram illustrating a transformer encoder unit according to aspects of the present disclosure;

As will be understood by those skilled in the art, encoder and decoder systems generally include multiple identical encoders and/or decoders, "stacked/cascaded" one on/after another repeated N times.

It can be theorized that learning sentence or paragraph-level embeddings for language is analogous to learning embeddings representing interactions in video snippets. Even though there are more differences than similarities such as modality and degree of information, in the process of re-purposing the transformer architecture to model video scene interactions, we arrive at various intricate observations about the transformer architecture, contrasts between the underlying structural patterns of language and image/video data, and possible future directions to improve learning and embeddings.

We note further that there exist several attention layers that have been proposed in the art—one of which is of particular interest to this work namely, scaled dot-product attention. As will be known and appreciated by those skilled in the art, a scaled dot product attention layer includes queries and keys of dimension $d_k$ and values of dimension $d_v$. A dot product is computed between a query and the product is scaled by $1/\sqrt{d_k}$ and then passed through a soft-max function to obtain the weights on the values. Dot-product attention is much faster and more space-efficient in practice as compared to additive attention—since it can be implemented using highly optimized matrix multiplication code.

As may be appreciated, the attention function can be computed on multiple queries in parallel when packed together into matrices Q, K and V.

$$\text{Attention}(Q, K, V) = \text{softmax}\left(\frac{QK^T}{\sqrt{d_k}}\right)V \quad [1]$$

Those skilled in the art will appreciate that multiple heads can learn different linear projections for the incoming query, keys and values respectively and perform the attention function in parallel (see, e.g., FIG. 2). without any additional computation.

Figure 2:
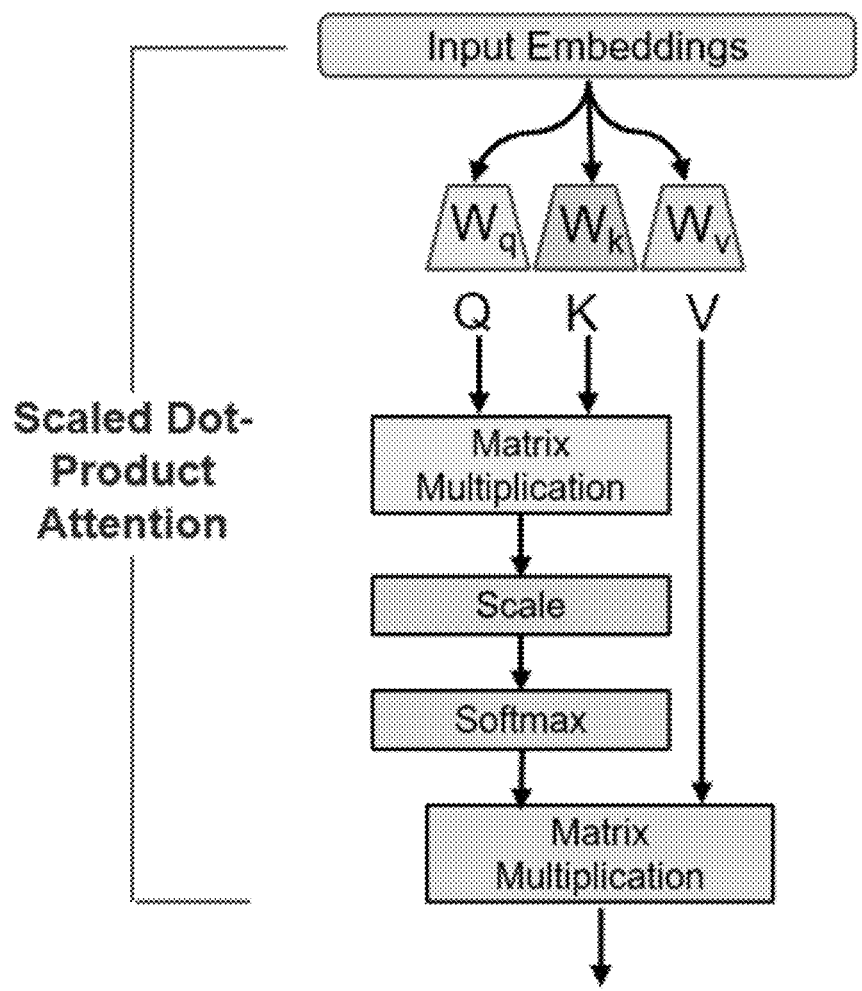
FIG. 2 illustrates a schematic diagram illustrating a scaled dot-product attention according to aspects of the present disclosure.

FIG. 2 illustrates a schematic diagram illustrating a scaled dot-product attention according to aspects of the present disclosure. As may be observed, the transformer encoder includes self-attention layers wherein keys, queries and values of a current layer are projections of an output encoding of a (immediate) previous layer. These projections are obtained by multiplying the incoming encoding by learned matrices $W_Q$, $W_K$, and $W_V$ respectively to obtain Q, K and V. This also implies that embeddings at each position in the encoder can attend to all positions in the previous layer of the encoder as seen in FIG. 2.

Multiple heads with different parallel projections of Q, K and V produce multiple versions of output encodings covering various possibilities which can be concatenated and projected down to an output embedding size.

Figure 3:
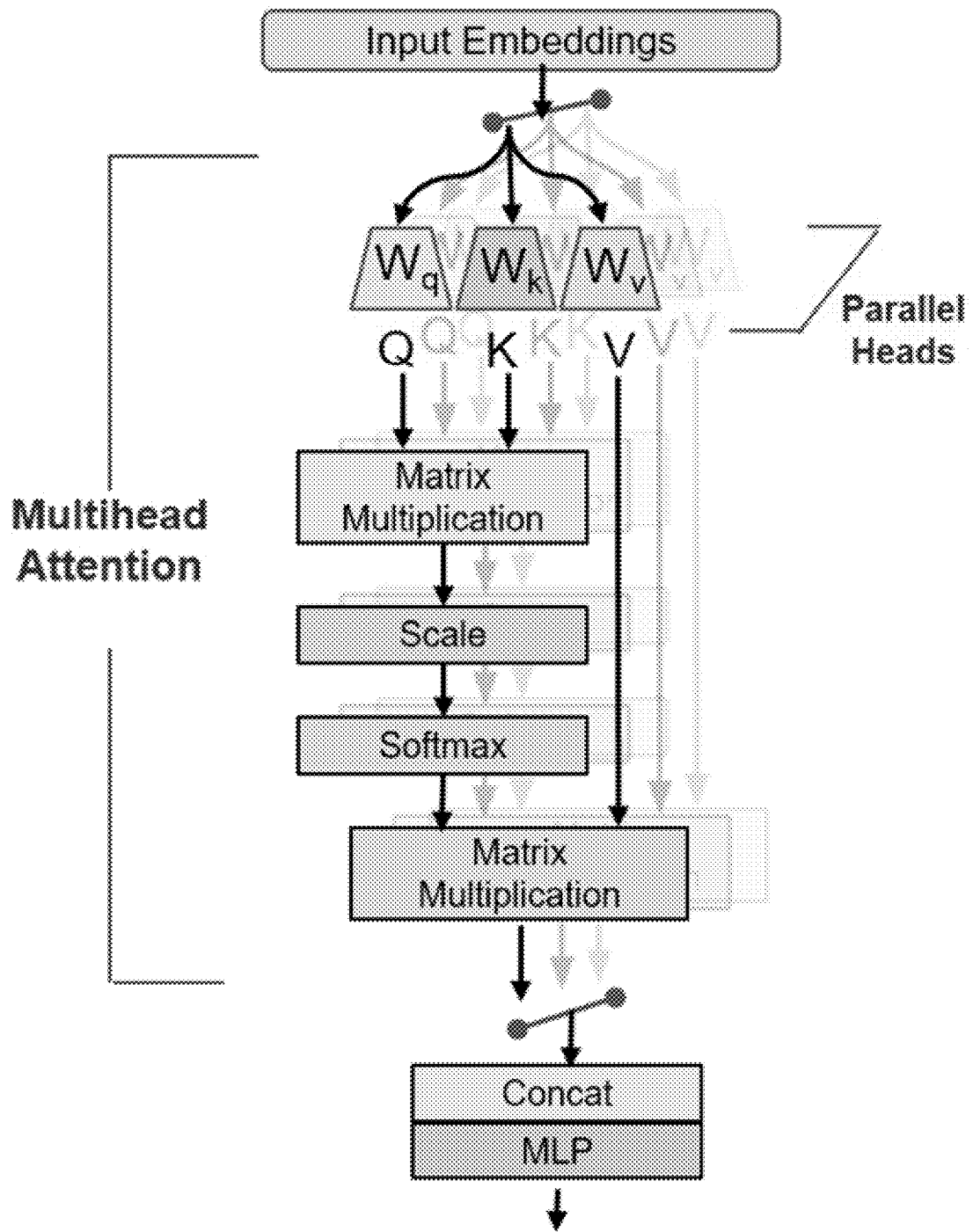
FIG. 3 is a schematic diagram illustrating a multi head attention according to aspects of the present disclosure.

FIG. 3 is a schematic diagram illustrating a multi head attention according to aspects of the present disclosure. These properties allow us to model higher order relationships between input feature sequences.

For example, one layer of attention would model all h times pair-wise relationships, two layers would model all h times triplet relationships and so forth (here h is the number of parallel heads with different Q, K and V projections of the same input encoding). Various works have explored the performance of attention layers in visual data processing concluding that stacked attention layers learn to combine local behavior—similar to convolution—and global attention based on input content. More generally, fully-attentional models seem to learn a generalization of CNNs where a kernel pattern is learned at the same time as the filters—similar to deformable convolutions.

As such, attention layers cover a broader class of generalization and/or dimensional reduction as done by convolution and become more relevant for high dimensional data such as videos.

Modeling Higher-Order Scene Interactions

Scene Embedding Tokenization

Importantly, the transformer encoder can be re-purposed to perform selective spatio-temporal dimension reduction to produce video embeddings. Modelling the input to the encoder from video frames becomes critical in achieving reasonable results.

In a language task, words are first tokenized and then converted to word embeddings of a fixed dimension. This sequence of word-embeddings is augmented with position embeddings and then fed into the transformer encoder in parallel. To achieve the same with video embeddings, we need a way to form embedding sequences of critical scene elements.

Figure 4:
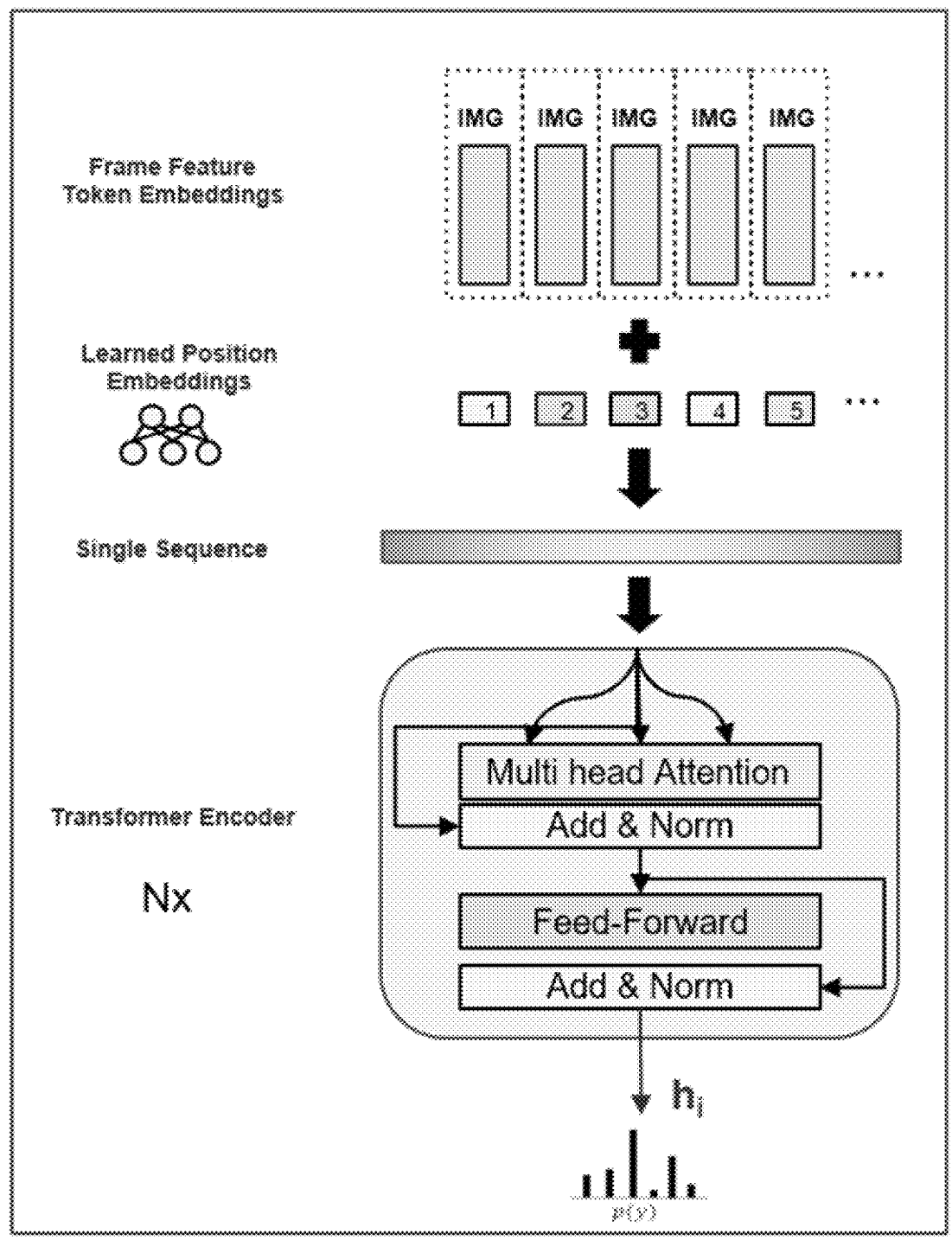
FIG. 4 is a schematic diagram illustrating redesigning input token embeddings for relationship modeling using a transformer encoder for embedding sequence of image features per frame according to aspects of the present disclosure.
Figure 5:
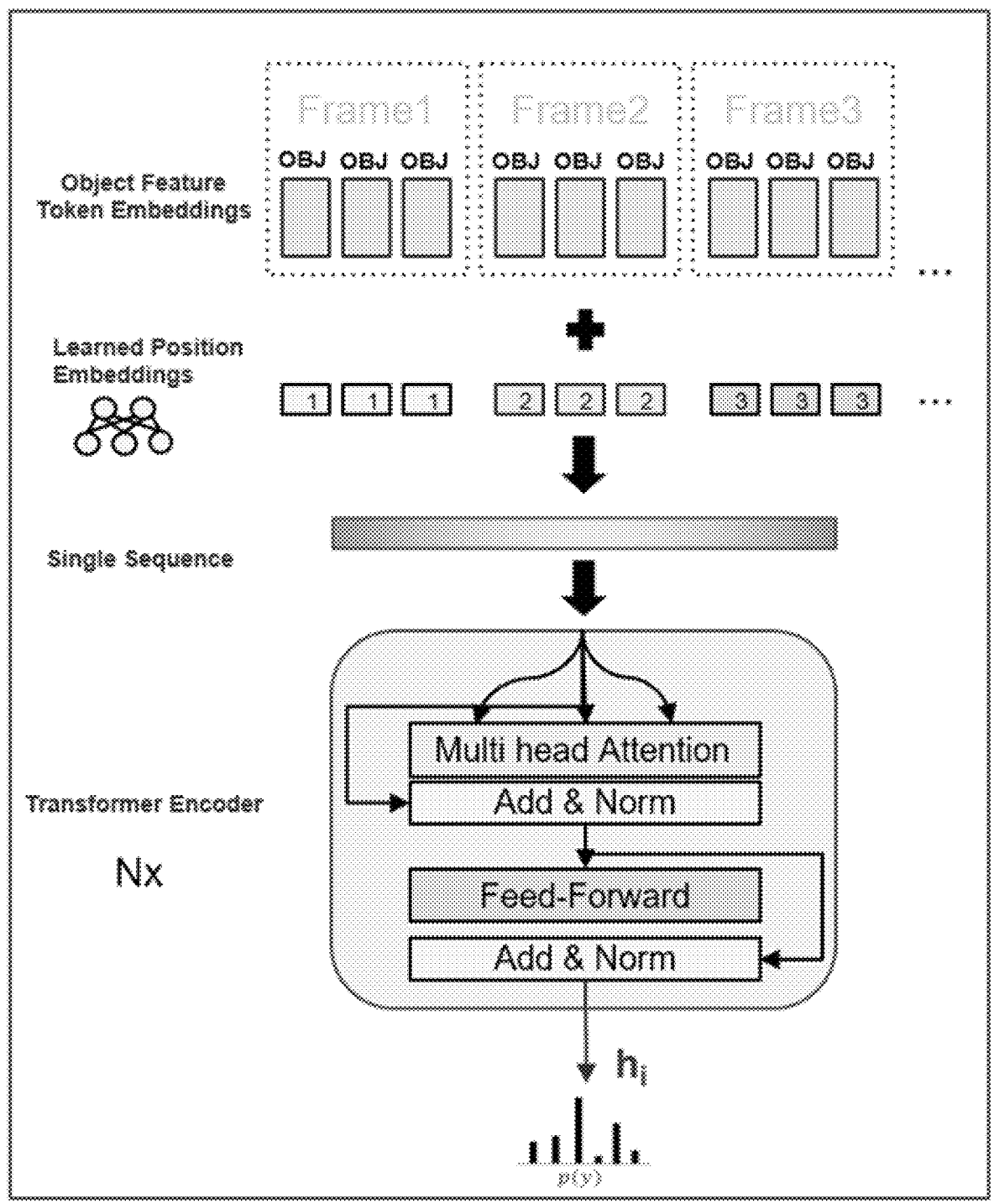
FIG. 5 is a schematic diagram illustrating redesigning input token embeddings for relationship modeling using a transformer encoder for embedding sequence of top-K object features per frame according to aspects of the present disclosure.

Input embedding-sequence of image features per frame: We attempt to model scene element relationships by extracting image/frame level features per frame using ResNext, oftentimes used as an image feature extractor. These image level features are stacked together to form the input embeddings to the transformer encoder as shown in the left of the following figures in which: FIG. 4 is a schematic diagram illustrating redesigning input token embeddings for relationship modeling using a transformer encoder for embedding sequence of image features per frame according to aspects of the present disclosure; and FIG. 5 is a schematic diagram illustrating redesigning input token embeddings for relationship modeling using a transformer encoder for embedding sequence of top-K object features per frame according to aspects of the present disclosure.

Input embedding-sequence of image+object features per frame: At this point we note that we increase the granularity of the tokens in the sequence by not only using image level features but also features of individual objects in the scene. The RFCN object detector is first used to get object bounding boxes in frame of a video snippet. Then RexNext is used to extract higher quality object features for top K accuracy objects.

Figure 6:
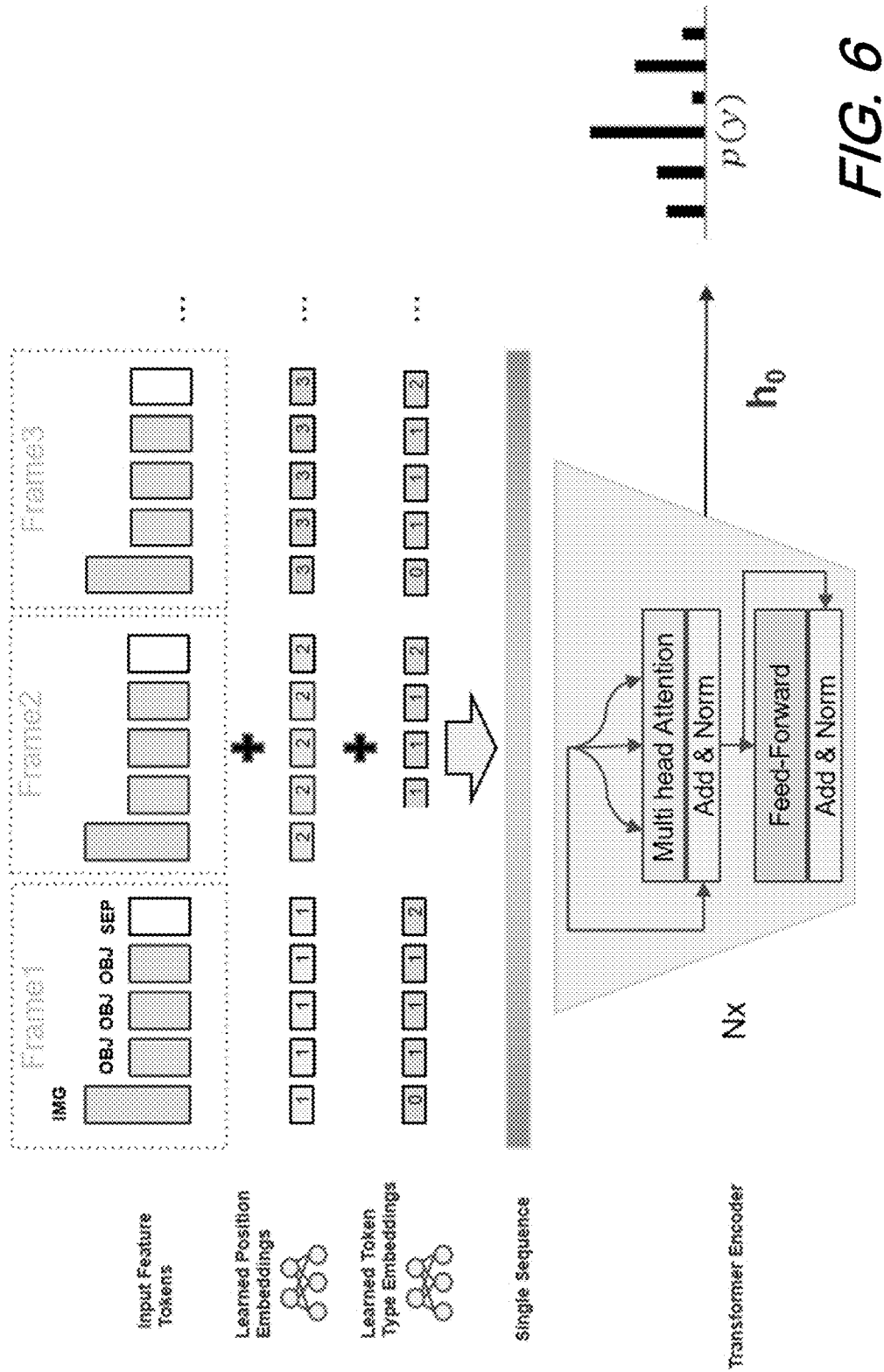
FIG. 6 is a schematic diagram illustrating redesigning input token embeddings for relationship modeling using a transformer encoder for embedding sequence of image+object features per frame according to aspects of the present disclosure.

For each frame, the image level features, and top K object features are stacked together to form the tokenized encoder input as shown in FIG. 6. which is a schematic diagram illustrating redesigning input token embeddings for relationship modeling using a transformer encoder for embedding sequence of image+object features per frame according to aspects of the present disclosure.

To separate different kind of token embeddings in the input embeddings sequence, we also experiment with an empty separator token, initialised as null that marks ending of one frame (FIG. 6).

Input embedding-sequence of object features per frame: We also explore the use of only the top K object features per frame stacked together to form the tokenized encoder input as shown—for example—in the right portion of FIG. 5.

Augmenting Embeddings with Additional Cues

Once the scene elements are tokenized, we add additional spatial and temporal cues to the embeddings to emphasize these priors. Similar to language tasks, temporal, type, and spatial encodings are converted into embeddings of the same dimension as input token embeddings. These embeddings are learned lookup tables.

All the learned embeddings are finally added together with the input token embeddings.

$$E_{final} = E_{scene} + E_{Position} + E_{Type} + E_{Spatial} \quad [2]$$

Here $E_{scene}$ can be either object feature or image feature based on the modeling.

Temporal Position (EPosition): It is important to note that transformers are permutation invariant. Not having temporal order cues represented in the learned video embeddings would make it difficult to differentiate certain action events such as videos categorized as 'opening door' versus 'closing door' in the Kinetics-400 dataset.

To emphasize temporal order, we augment our input embeddings with position embeddings. These position encodings signify an increasing order of time annotations per frame. This incorporates temporal order cues in the input token embeddings as seen in FIG. 5 and FIG. 6. These position encodings are learned during training using sequences as simple as frame numbers and are of the same dimension as the input token embeddings.

Token Type (EType): We use designs with input embedding sequences made from heterogeneous tokens, some representing entire image frames having many objects and background information while others representing individual physical objects found in our environment.

To learn relationships across these heterogeneous embeddings of different granularity, we augment the input embeddings with token type embeddings to incorporate categorical cues as shown in FIG. 6. These categorical cues differentiate input token embeddings into type 1 and 2 for image and object level features.

Spatial Position (Espatial): In order to further add spatial cues to make up for the lost background information around objects from full frames, we infuse spatial location information to each of the object tokens. Embeddings are learned from object bounding box coordinates $(x_1, y_1, x_2, y_2)$ predicted by the object detector network from each frame.

Video Action Recognition Pipeline

With these architectures described, we construct a pipeline (FIG. 7) to learn higher-order spatial-temporal interactions among scene elements for solving the Video Action Recognition task. We evaluate our model on the Kinetics-400 dataset.

Figure 7:
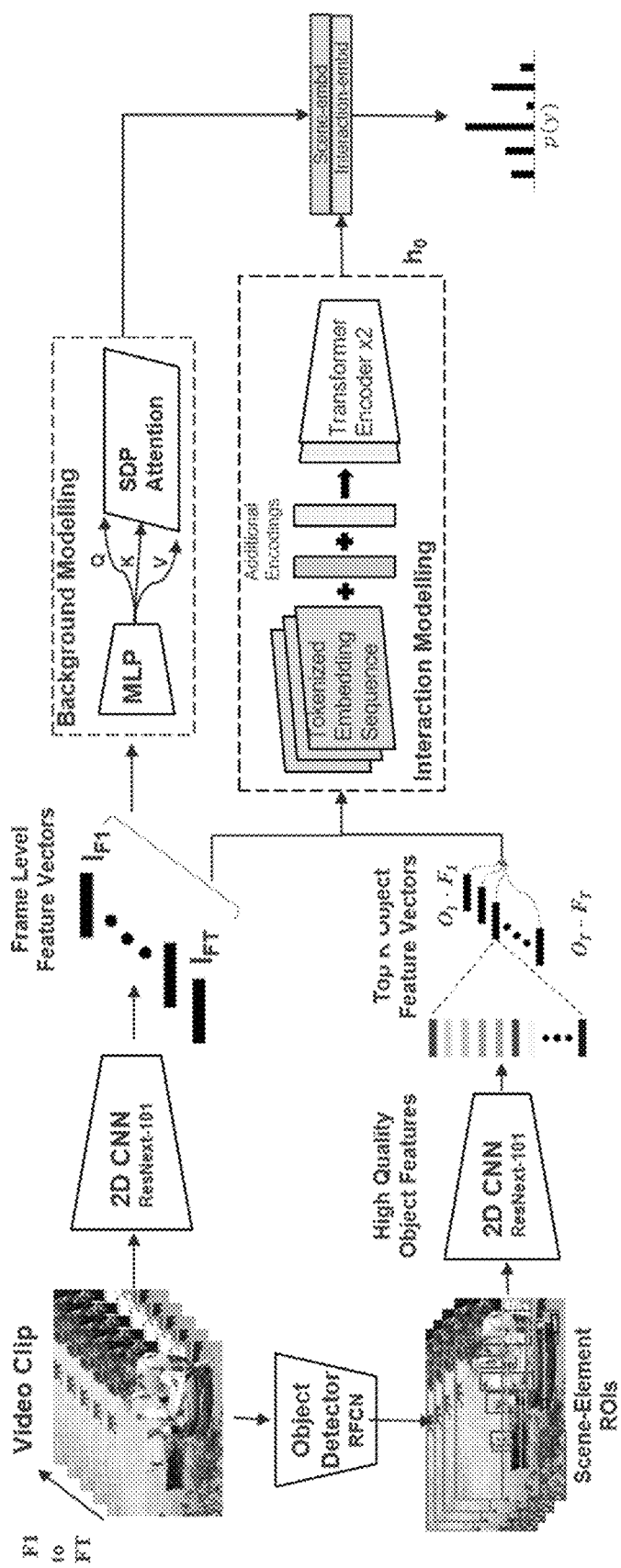
FIG. 7 is a schematic diagram illustrating video action recognition pipeline according to aspects of the present disclosure.

FIG. 7 is a schematic diagram illustrating video action recognition pipeline according to aspects of the present disclosure A backbone feature extraction network ResNext and an object detector RFCN are used for feature extraction. ResNext-101 is used for extracting image level features per frame and the object RFCN is used for object detection per frame. ROI's of top K objects are then used to crop and resize scene images using an ROI-Align unit and are then passed through ResNext-101 to extract object features. These features are then input to interaction modeling and background modeling units as shown in FIG. 7.

Interaction Modelling Unit: The interaction modelling unit models the spatio temporal interactions across scene elements. First the image and object feature vectors are stacked together to form the input embedding sequence. Then temporal, spatial and type embeddings are added to the input embedding to form a final embedding sequence. This embedding sequence is then passed through a two-layer multi-head transformer encoder. A detailed version of is shown schematically in FIG. 3.

Background Modelling Unit: The frame level features are passed through a single Scaled Dot Product Attention Layer. Here Q, K and V are just three different projections of the input vector sequence through MLPs. Finally, the background and interaction embeddings are concatenated together and are fed to a classifier that classifies the video snipped into action categories.

Performance Analysis

Accuracy on Kinetics-400

As noted previously, we train our action recognition pipeline with the transformer based Interaction Modelling Unit on the Kinetics-400 dataset at 1 FPS.

The object detector Convolution Neural Network RFCN is first trained on an MS COCO dataset. For the feature extraction network, we employ ResNext models pre-trained in weakly-supervised fashion on 940 million public images with 1.5K hashtags matching with 1000 ImageNet1K synsets, followed by fine-tuning on ImageNet1K dataset. Results show improved performance on many important vision tasks.

We utilize this new massively pre trained ResNext network to extract high quality image and object features. We extract object and image features of vector of dimension 2048, experiment with different number of layers and heads in the transformer encoder, force classification on the first hidden layer of the encoder's output and finally concatenate interaction embedding and scene embedding to form a 4096 dimension feature vector which is classified into one of 400 Kinetics classless. An Adam optimizer is used with a learning rate decay. The task is modeled as a multi-class classification with cross-entropy loss. The model is trained on NVIDIA-GTX 1080ti GPUs.

We achieved the best results while using only the top 15 objects per frame in transformer based interaction modelling unit with position embeddings, with 2 layers of transformer encoder having 2 parallel heads each. These results outperform other Architectures such as SINet and I3D on the Kinetics-400 Dataset.

TABLE 1

Kinetics-400 Action Recognition
Kinetics-400 Action Recognition Performance

| Transformer Interaction Modelling Architecture | Interaction Params($e^9$) | Optimizer, Learning Rate | Top1 Acc | Top5 Acc |
|---|---|---|---|---|
| TxEncoder(2H2L) + (OBJ) | 0.085 | Adam,5e−5 | 77.50 | 92.68 |

Performance Comparison with SINet

As will be readily appreciated by those skilled in the art, our model improves upon the accuracy reported for SINet by 3 percent.

We note that this particular architecture is chosen specifically for comparison since it also chooses to model scene element interactions, but it does so using a sequential LSTM based recurrent unit. The Table 2 shows our performance comparison on Kinetics-400 along with the other architectures. For our transformer based architecture 'Img+15 Obj' implies that we use image features with top 15 object features per scene, '2H2L' implies that the transformer encoder is made up of 2 parallel heads and 2 layers.

Retraining SINet with the New ResNext-101 Backbone

Research in the computer vision filed evolves rapidly and results get outdated as new findings are published. The ResNext models released by authors Kaiming He et al. left the results reported by SINet outdated as the network used an older ResNext model pre-trained on a smaller dataset. We decided to reevaluate SINet's performance by retraining it with new high quality image and object features from ResNext-101 34-8d, the results of which are shown in Table 3.

TABLE 2

Kinetics-400 Action Recognition: Performance Comparison with SINet
Kinetics-400 Action Recognition Performance Evaluation

| Architecture | Interaction Params($e^9$) | FPS | Top1 Acc | Top5 Acc |
|---|---|---|---|---|
| I3D | | 25 | 71.1 | 89.3 |
| ImgFeat + LSTM | — | 1 | 70.6 | 89.1 |
| SINet (HOI = 1) | 0.064 | 1 | 73.90 | 91.3 |
| SINet (HOI = 2) | 0.140 | 1 | 74.20 | 91.5 |
| SINet (HOI = 3) | 0.140 | 1 | 74.2 | 91.7 |
| Ours (Img + 15 Obj + sep) 4H2L | 0.144 | 1 | 77.30 | 92.11 |
| Ours (Img + 15 Obj) 4H2L | 0.120 | 1 | 77.48 | 92.12 |
| Ours (15Obj) 2H2L | 0.085 | 1 | 77.50 | 92.68 |

TABLE 3

Kinetics-400 Action Recognition: Performance
Comparison after re training SINet
Kinetics-400 Action Recognition Performance Evaluation

| Architecture | Interaction Params($e^9$) | FPS | Top1 Acc | Top5 Acc |
|---|---|---|---|---|
| ImgFeat + LSTM (baseline) | — | 1 | 74.2 | 91.28 |
| SINet (HOI = 3) | 0.140 | 1 | 77.37 | 93.89 |
| Ours (Img + 15 Obj + sep) 4H2L | 0.144 | 1 | 77.30 | 92.11 |
| Ours (Img + 15 Obj) 4H2L | 0.120 | 1 | 77.48 | 92.12 |
| Ours (15Obj) 2H2L | 0.085 | 1 | 77.50 | 92.68 |

The retraining brings SINet accuracy up to 77 percent which is similar to our results. As SINet's performance becomes comparable to our results, it is difficult to say which architecture is preferred over the other. We also notice that even though our model is 0.1 percent ahead of SINet in the top1 class accuracy, it performs worse than SINet at the top5 class accuracy by 1.2 percent.

Token Embedding Design Comparison

In Table 4, we show comparison across different token embeddings designs for the transformer encoder unit. We can make the observation that the transformer encoder seems to model relationships across uniform token embeddings better. In this case sequences made up of only object features perform the best 77.5 percent.

TABLE 4

Kinetics-400 Action Recognition: Token Embedding Design Comparison
Kinetics-400 Action Recognition Performance Evaluation

| Transformer Interaction Modelling Architecture | Params($e^9$) (Excluding backbones) | Optimizer, Learning Rate | Top1 Acc | Top5 Acc |
|---|---|---|---|---|
| TxEncoder(4H4L) + (IMG) | 0.144 | Adam,5e−5 | 75.81 | 91.43 |
| TxEncoder(2H2L) + (OBJ) | 0.085 | Adam,5e−5 | 77.50 | 92.68 |
| TxEncoder(4H4L) + (IMG&OBJ) | 0.144 | Adam,5e−5 | 77.48 | 91.12 |

TABLE 5

Kinetics-400 Action Recognition: Temporal Position Ques
Emphasizing Order Improve Performance
Kinetics-400 Action Recognition Performance Evaluation

| Architecture | Interaction Params($e^9$) | FPS | Top1 Acc | Top5 Acc |
|---|---|---|---|---|
| Ours (Img + 15 Obj + sep) NoPos 4H2L | 0.144 | 1 | 76.03 | 92.00 |
| Ours (Img + 15 Obj + sep) 4H2L | 0.144 | 1 | 77.30 | 92.11 |

In a language task, word embeddings are well differentiated and contain uniform amount of information in each token embedding, i. e. each token is just a word mapped to a uniquely hashed and learned lookup table. In case of video understanding when we try to combine features that represent full image scenes with features that represent individual objects into a single sequence to feed into the transformer encoder, then it is speculated that the data becomes non uniform which makes it difficult for the transformer encoder to compute relationships across the sequence.

We also show in the Table 5 that adding position cues increases the overall performance. The same cannot be said affirmatively for token type embeddings or spatial position embeddings.

Comparing Transformer Encoder Heads and Layers

We show experiments with different number of heads and layers in Table 6.

TABLE 6

Kinetics-400 Action Recognition: Transformer
Encoder Head versus Layers
Kinetics-400 Action Recognition Performance Evaluation

| Architecture | Interaction Params($e^9$) | FPS | Top1 Acc | Top5 Acc |
|---|---|---|---|---|
| Ours (Img + 15 Obj + sep) 4H2L | 0.144 | 1 | 76.03 | 92.00 |
| Ours (15Obj) 2H2L | 0.085 | 1 | 77.50 | 92.68 |

TABLE 7

Performance Comparison: SINet Interaction Modelling Unit - Floating Point Operations Per Second

| COMPONENT | SINet | HOI | Flops | K | FRAMES | TOTAL |
|---|---|---|---|---|---|---|
| $MLP_1$ | 1 | 15 | 2048 | 2048 | 3 | 10 | 1.89E+09 |
| $MLP_2$ | 1 | 15 | 2048 | 2048 | 3 | 10 | 1.89E+09 |
| $MLP_3$ | 1 | 15 | 2048 | 2048 | 3 | 10 | 1.89E+09 |
| HOI SDP | | | | | | | |
| $W_h * H_t - 1$ | 1 | 1 | 2048 | 2048 | 3 | 10 | 1.26E+08 |
| $W_c * V_c t$ | 1 | 1 | 2048 | 2048 | 3 | 10 | 1.26E+08 |
| MatMul | 1 | 15 | 15 | 2048 | 3 | 10 | 1.38E+07 |
| MatMul | 1 | 15 | 15 | 2048 | 3 | 10 | 1.38E+07 |
| LSTM Cell | 2 | 8 | 2048 | 2048 | 3 | 10 | 2.01E+09 |
| Total SINet HOI Flops | | | | | | | 7.95E+09 |

We observe that a smaller number of heads gives better performance on the action recognition stack. Even though the performance is similar, it is a maximum at 2 heads. We also evaluate a number of layers, and we discover that there is not improvement in performance if we increase the number of layers to more than 2.

Computing Floating Point Operations Per Second

We compute the floating point operations per second performed by the Transformer Interaction modeling unit (2heads, 2Layers) and compare it to SiNet's HOI unit (order:K=3) as shown in Table 7 and Table 8. Both architectures are evaluated with a common backbone having 16 G Flops and 53 G FLOPS for ResNext-101 and RFCN respectively. We note that the computation seems incorrect for transformer.

TABLE 8

Performance Comparison: Transformer Interaction Modelling Unit - Floating Point Operations Per Second

| COMPONENT | | COMPUTE | | | CHUNK SZ | FRAMES | TOTAL |
|---|---|---|---|---|---|---|---|
| OBJ PROJ | 1 | 15 | 2048 | 2048 | 1 | 10 | 6.29E+08 |
| POS ENCODING | 1 | 1 | 1 | 2048 | 15 | 10 | 3.07E+05 |
| Q | 1 | 1 | 2048 | 2048 | 15 | 10 | 6.29E+08 |
| K | 1 | 1 | 2048 | 2048 | 15 | 10 | 6.29E+08 |
| V | 1 | 1 | 2048 | 2048 | 15 | 10 | 6.29E+08 |
| MatMul(Q.K) | 1 | 15 | 1 | 2048 | 15 | 10 | 4.61E+06 |
| MatMul(K.V) | 1 | 15 | 1 | 2048 | 15 | 10 | 4.61E+06 |
| FeedFwd | | | 2048 | 2048 | 15 | 10 | 6.29E+08 |
| FeedFwd | | | 2048 | 2048 | 15 | 10 | 6.29E+08 |
| | | | | | | One Time | 6.29E+08 |
| | | | | | | Per Layer | 3.15E+09 |
| | | | | | | of Layers | 2 |
| Total Tx Flops | | | | | | | 6.94E+09 |

Top Performers on Kinetics-400

We note that top-ranked models on kinetics 400, focus less on architecture design and more on large scale semi-supervised pre-training achieving 82.8 and 83.6 percent respectively.

Learning Temporal Priors to Improve Video Understanding

We note that our current architecture does not take advantage of pre-training the transformer. Similar to BERT, if the transformer encodings are pre-trained to learn temporal priors such as ordering of frames during actions in a self-supervised manner, then performance on downstream tasks such as action classification could be improved for classes which heavily rely on order of events.

Object Based Vocabulary Construction for Finer Interaction Modelling

In order to precisely map object features to different class categories, we note that ability to build a dictionary look up table similar to what exists at the moment for words in natural language processing. If this general vocabulary of objects is built then the task of object detection could be made simpler and in turn improve the action recognition pipeline.

Object-Based Supervision?

Since the object detector takes up most of the computation in our video understanding pipeline, if we remove object detection based computation and build an end-to-end model that implicitly learns key-scene element features (not necessarily objects) and classifies the video clip based on it, performance gains may be further realized.

Action Recognition Datasets and Video Understanding

How much supervision is enough for obtaining a better video understanding remains unknown, since videos tend to be an aggregation of many tangled and convoluted events. An interesting action recognition dataset may have labels categorized as fine-grained and compound actions which may help building more refined action recognition techniques and improve video understanding.

Those skilled in the art will appreciate that fined grained actions are short-term, human-centric and verb-like. For example: picking, dropping, holding, digging, waving, standing, sitting, blinking, walking, moving, reading and so forth. These fine grain action could be assigned to a smaller window of frames. Compound actions would usually be a combination of fine grained actions and complementary objects that aid the action. These compound actions would be a better way to classify long video clips.

For example, preparing tea involves pouring, stirring, boiling water, steeping etc. Similarly, Salsa Dancing involves humans moving, salsa attire, stage/floor. Finally, Stealing may involve Picking, Running, pushing etc.

Similar to work that implicitly works with different time scales and others the video understanding system would have the capability to identify these fine-grained actions per few frames of the video, and also, show a running average of the Compound Action Classification over the past K frames.

Class-Wise Performance Comparison

When we compare class-wise accuracy of SINET retrained with ResNet-101 32-8d and our transformer based architecture, we notice that for many cases our model performs better on fast changing scenes, for example, cartwheeling, sneezing, swinging legs, clapping, shaking hands, dunking a basketball, etc. We also notice that the accuracy drips over many spatial classes, for example, decorating a holiday tree, eating a burger, bookbinding, playing a violin, changing a wheel, etc.

TABLE A1

Best Performing Classes
Best Performing Classes from Kinetics-400

| Class | Ours(Acc) | SINET(Acc) | Gain Percent |
|---|---|---|---|
| eating doughnuts | 0.6734694 | 0.4693878 | 43.48 |
| sneezing | 0.3000000 | 0.2200000 | 36.36 |
| swinging legs | 0.5400000 | 0.4000000 | 35.00 |
| clapping | 0.4791667 | 0.3750000 | 27.78 |
| tasting food | 0.5510204 | 0.4489796 | 22.73 |
| shaking hands | 0.3541667 | 0.2916667 | 21.43 |
| long jump | 0.6400000 | 0.5400000 | 18.52 |
| swimming breast stroke | 0.9000000 | 0.7600000 | 18.42 |
| petting animal (not cat) | 0.6734694 | 0.5714286 | 17.86 |
| making a cake | 0.5918368 | 0.5102041 | 16.00 |
| cooking egg | 0.5800000 | 0.5000000 | 16.00 |
| baking cookies | 0.8979592 | 0.7755102 | 15.79 |
| cooking sausages | 0.6000000 | 0.5200000 | 15.38 |
| gargling | 0.7755102 | 0.6734694 | 15.15 |
| opening bottle | 0.7600000 | 0.6600000 | 14.81 |
| brushing hair | 0.6200000 | 0.5400000 | 14.29 |
| drinking | 0.4897959 | 0.4285714 | 14.29 |
| cartwheeling | 0.6530612 | 0.5714286 | 13.89 |
| water sliding | 0.8200000 | 0.7200000 | 12.50 |
| drop kicking | 0.3829787 | 0.3404255 | 12.50 |
| massaging person's head | 0.7200000 | 0.6400000 | 12.50 |
| tying bow tie | 0.7200000 | 0.6400000 | 12.50 |
| dancing gangnam style | 0.5625000 | 0.5000000 | 12.50 |
| dunking basketball | 0.7500000 | 0.6666667 | 12.50 |
| skiing crosscountry | 0.9000000 | 0.8000000 | 12.50 |
| skipping rope | 0.7916667 | 0.7083333 | 11.76 |
| garbage collecting | 0.7755102 | 0.6938776 | 11.76 |
| yawning | 0.4489796 | 0.4081633 | 10.00 |
| tossing coin | 0.6800000 | 0.6200000 | 9.68 |
| checking tires | 0.9200000 | 0.8400000 | 9.52 |
| swimming backstroke | 0.9200000 | 0.8400000 | 9.52 |
| exercising with an exercise ball | 0.7291667 | 0.6666667 | 9.37 |
| massaging back | 0.9591837 | 0.8775510 | 9.30 |
| baby waking up | 0.7400000 | 0.6800000 | 8.82 |
| catching or throwing softball | 0.7400000 | 0.6800000 | 8.82 |
| strumming guitar | 0.7400000 | 0.6800000 | 8.82 |

TABLE A2

Worst Performing Classes
Worst Performing Classes from Kinetics-400

| Class | Ours(Acc) | SINET(Acc) | Drop Percent |
|---|---|---|---|
| decorating the christmas tree | 0.9183673 | 1.0000000 | 8.89 |
| tickling | 0.6600000 | 0.7200000 | 9.09 |
| skiing (not slalom or crosscountry) | 0.6530612 | 0.7142857 | 9.38 |
| kissing | 0.6888889 | 0.7555556 | 9.68 |
| eating burger | 0.8367347 | 0.9183673 | 9.76 |
| bookbinding | 0.8200000 | 0.9000000 | 9.76 |
| ice skating | 0.8163266 | 0.8979592 | 10.00 |
| passing American football (in game) | 0.7800000 | 0.8600000 | 10.26 |
| playing violin | 0.7800000 | 0.8600000 | 10.26 |
| punching person (boxing) | 0.6041667 | 0.6666667 | 10.34 |
| dancing charleston | 0.3877551 | 0.4285714 | 10.53 |
| celebrating | 0.5600000 | 0.6200000 | 10.71 |
| changing wheel | 0.5600000 | 0.6200000 | 10.71 |
| cracking neck | 0.5625000 | 0.6250000 | 11.11 |
| playing flute | 0.7000000 | 0.7800000 | 11.43 |
| shining shoes | 0.7000000 | 0.7800000 | 11.43 |
| bending metal | 0.5200000 | 0.5800000 | 11.54 |
| jogging | 0.5000000 | 0.5600000 | 12.00 |
| news anchoring | 0.5800000 | 0.6600000 | 13.79 |
| ripping paper | 0.5714286 | 0.6530612 | 14.29 |

TABLE A2-continued

Worst Performing Classes
Worst Performing Classes from Kinetics-400

| Class | Ours(Acc) | SINET(Acc) | Drop Percent |
|---|---|---|---|
| digging | 0.6734694 | 0.7755102 | 15.15 |
| sharpening knives | 0.6400000 | 0.7400000 | 15.63 |
| somersaulting | 0.3800000 | 0.4400000 | 15.79 |
| air drumming | 0.5102041 | 0.5918368 | 16.00 |
| laughing | 0.5208333 | 0.6041667 | 16.00 |
| cleaning floor | 0.6326531 | 0.7346939 | 16.13 |
| tap dancing | 0.6326531 | 0.7346939 | 16.13 |
| juggling soccer ball | 0.7000000 | 0.8200000 | 17.14 |
| stretching arm | 0.4200000 | 0.5000000 | 19.05 |
| throwing ball | 0.2800000 | 0.3400000 | 21.43 |
| dancing macarena | 0.4489796 | 0.5714286 | 27.27 |
| auctioning | 0.6326531 | 0.8163266 | 29.03 |
| triple jump | 0.3877551 | 0.5102041 | 31.58 |
| applauding | 0.3000000 | 0.4600000 | 53.33 |
| rock scissors paper | 0.2200000 | 0.3800000 | 72.73 |
| slapping | 0.0612245 | 0.1294490 | 100.00 |

Tracking Enabled Action Recognition

Figure 8:
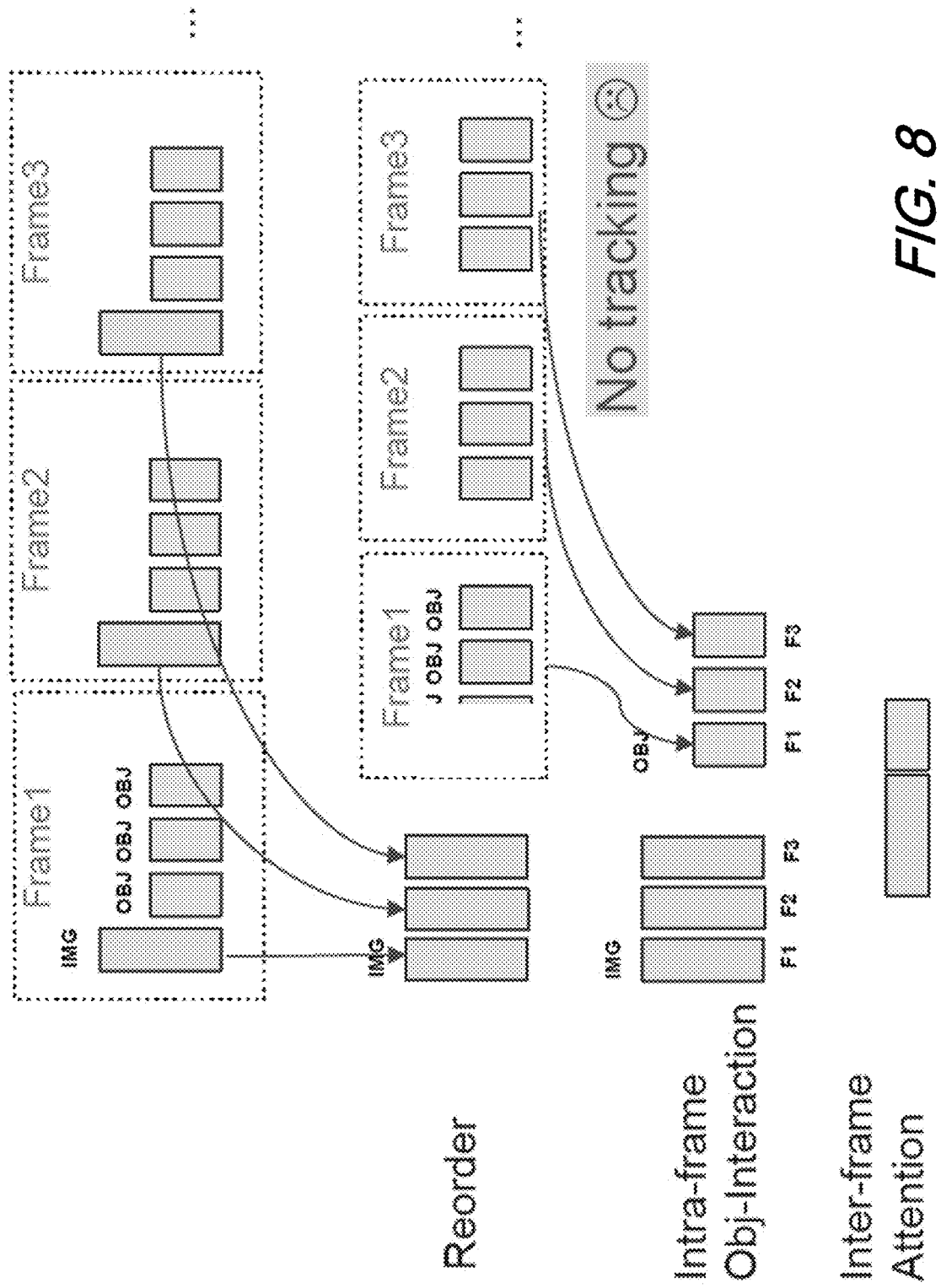
FIG. 8 is a schematic diagram illustrating a non-tracking enabled action recognition process for video representation.
Figure 9:
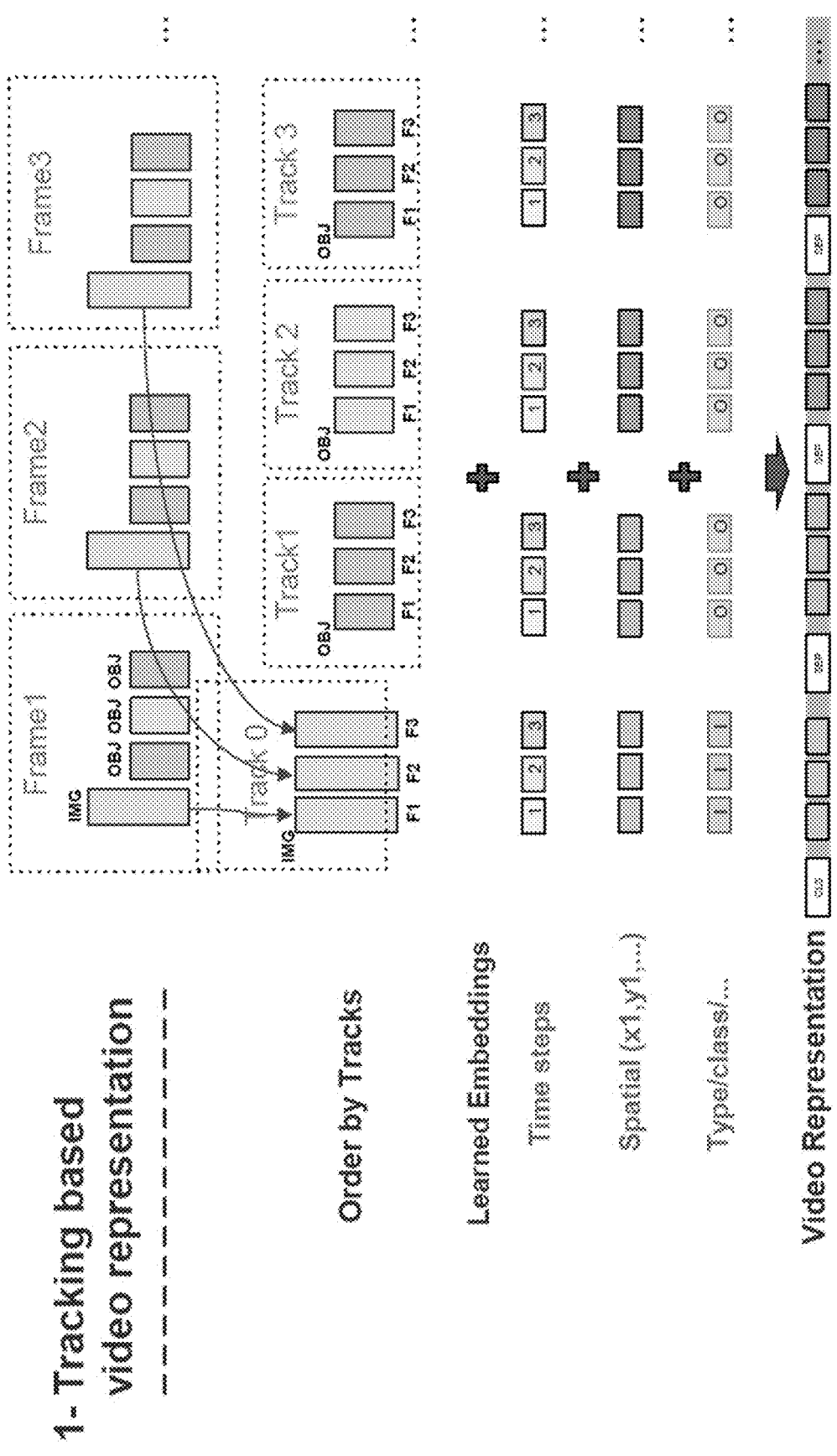
FIG. 9 is a schematic diagram illustrating a tracking enabled action recognition process for video representation according to aspects of the present disclosure.

FIG. 8 is a schematic diagram illustrating a non-tracking enabled action recognition process for video. In sharp contrast, FIG. 9 is a schematic diagram illustrating a tracking enabled action recognition process for video representation according to aspects of the present disclosure. With reference to that figure it may be observed that a series of frames . . . Frame 1, Frame, 2, and Frame 3, each include several elements including an image further including a number of objects. In this illustrative example, there are three objects in each frame.

Each frame is detected by an object detector to locate any visual elements. Those objects are linked through time to form object tracks.

As may be observed in the figure, each of the elements are ordered by tracks. As illustrated . . . Track 0 includes the image element from each of the frames. Track 1 includes the first object element from each of the frames. Track 2 includes the second object element from each of the frames. Finally, Track 3 includes the third object from each of the frames.

This ordered/organized set of object tracks are then further organized and input to our model. The model is trained to generate representative embeddings and discriminative video features through high-order interaction which is formulated as an efficient matrix operation without iterative processing delay.

Figure 10:
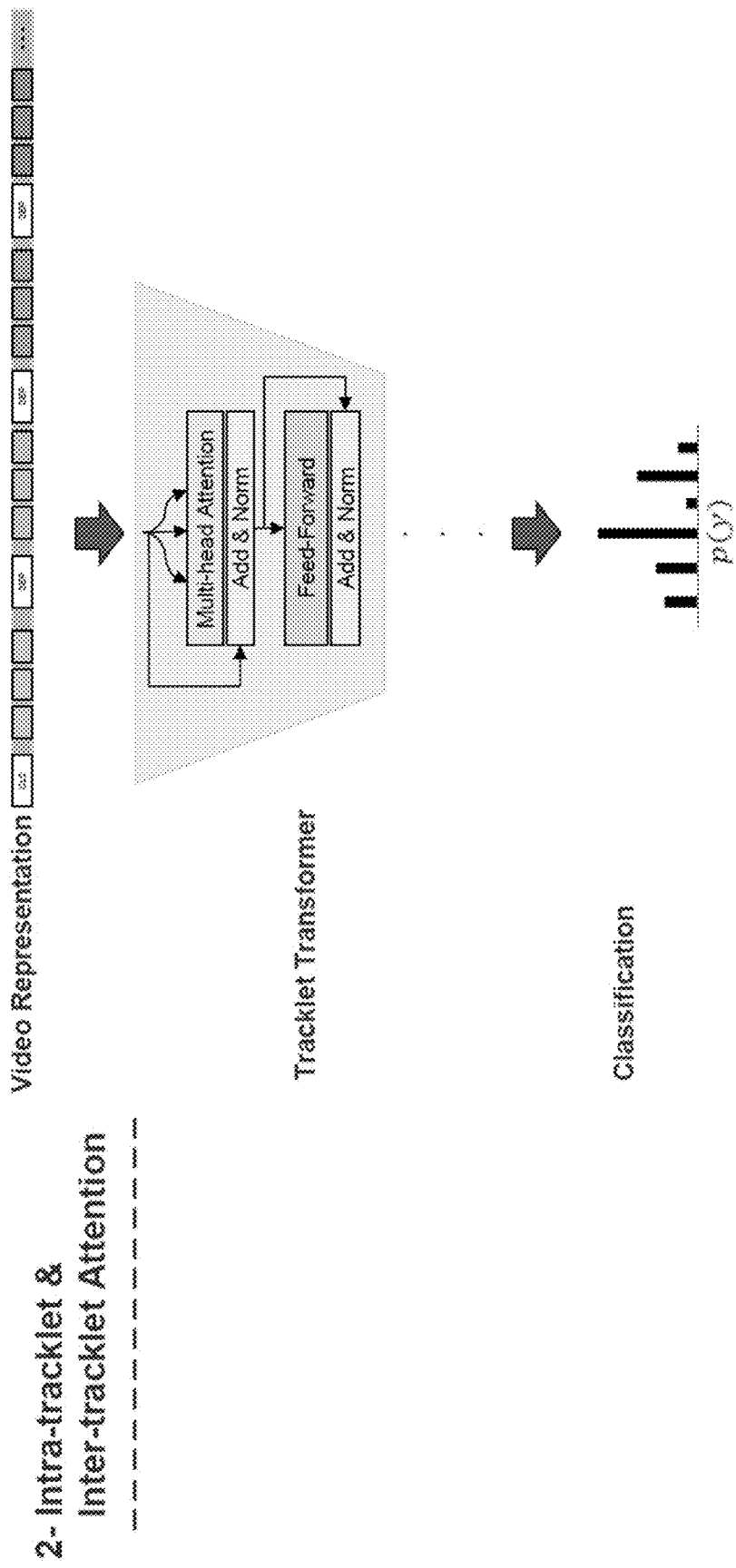
FIG. 10 is a schematic diagram illustrating a tracking enabled action recognition process for intra-tracklet and inter-tracklet attention according to aspects of the present disclosure.

FIG. 10 is a schematic diagram illustrating a tracking enabled action recognition process for intra-tracklet and inter-tracklet attention according to aspects of the present disclosure. As may be observed from the figure, the video representation so produced is input to our tracklet transformer which operationally produces our classification.

At this point, while we have presented this disclosure using some specific examples, those skilled in the art will recognize that our teachings are not so limited. Accordingly, this disclosure should only be limited by the scope of the claims attached hereto.

The invention claimed is:

1. A method for determining action recognition in frames of a video through spatio-temporal object tracking, the method comprising:
detecting a plurality of visual objects (O[0] . . . O[n]) in a plurality of frames (F[0] . . . F[n]) of the video;
linking visual objects that are the same through time to form a plurality of object tracks (T[0] . . . T[n]), such that track T[0] includes an image element from each of the frames F[0] . . . F[n], track T[1] consists of objects O[1] from each of the frames F[1], F[2], . . . F[n], track T[2] consists of objects O[2] from each of the frames F[1], F[2], . . . F[n], . . . , and track T[n] consists of objects O[n] from each of the frames F[1], F[2], . . . F[n];

organizing and combining the plurality of object tracks with embeddings, said embeddings including time step embeddings, spatial embeddings, and type/class embeddings;

applying the organized and combined object tracks to a neural network model, said model trained to generate representative embeddings and discriminative video features through high-order interaction formulated as a matrix operation without iterative processing delay.

2. The method of claim 1 wherein the neural network model is a transformer.

3. The method of claim 1 wherein the neural network model includes redesigning input token embeddings for relationship modeling employing a transformer encoder for embedding sequence of image features per frame.

4. The method of claim 1 wherein the neural network model includes redesigning input token embeddings for relationship modeling employing a transformer encoder for embedding sequence of top-K object features per frame.

5. The method of claim 1 wherein the neural network model includes redesigning input token embeddings for relationship modeling using a transformer encoder for embedding sequence of image+object features per frame.

6. The method of claim 1 wherein the applying and organizing includes top 15 objects per frame in transformer based interaction modelling unit with position embeddings.

7. The method of claim 6 further comprising with 2 layers of transformer encoder having 2 parallel heads each.

8. The method of claim 1, wherein the neural network includes the object tracks are then further organized and input to a model that is trained to generate representative embeddings and discriminative video features through high-order interaction which is formulated as an efficient matrix operation without iterative processing delay.

9. The method of claim 1, wherein the neural network includes a tracking enabled action recognition process for intra-tracklet and inter-tracklet attention.

10. The method of claim 1, wherein the neural network includes a video representation input to a tracklet transformer which operationally produces a classification.

* * * * *